United States Patent
Kuraya et al.

(10) Patent No.: US 12,198,153 B2
(45) Date of Patent: Jan. 14, 2025

(54) INFORMATION PROCESSING DEVICE, INFORMATION PROCESSING METHOD, AND SYSTEM

(71) Applicant: unerry inc., Toyko (JP)

(72) Inventors: Hiroyasu Kuraya, Toyko (JP); Hidetoshi Uchiyama, Toyko (JP)

(73) Assignee: unerry inc., Tokyo (JP)

( * ) Notice: Subject to any disclaimer, the term of this patent is extended or adjusted under 35 U.S.C. 154(b) by 365 days.

(21) Appl. No.: 17/761,927

(22) PCT Filed: Sep. 4, 2020

(86) PCT No.: PCT/JP2020/033601
§ 371 (c)(1),
(2) Date: Mar. 18, 2022

(87) PCT Pub. No.: WO2021/054150
PCT Pub. Date: Mar. 25, 2021

(65) Prior Publication Data
US 2022/0343345 A1 Oct. 27, 2022

(30) Foreign Application Priority Data
Sep. 20, 2019 (JP) .................................. 2019-171640

(51) Int. Cl.
*G06Q 30/0201* (2023.01)
*G06N 20/00* (2019.01)
(52) U.S. Cl.
CPC ......... *G06Q 30/0201* (2013.01); *G06N 20/00* (2019.01)
(58) Field of Classification Search
None
See application file for complete search history.

(56) References Cited

U.S. PATENT DOCUMENTS

| | | | |
|---|---|---|---|
| 9,167,554 B1 * | 10/2015 | Sjölund | H04W 4/029 |
| 2006/0067226 A1 * | 3/2006 | Chandra | H04W 24/00 |
| | | | 370/235 |

(Continued)

FOREIGN PATENT DOCUMENTS

| | | |
|---|---|---|
| JP | 2013-235511 A | 11/2013 |
| JP | 2017-022505 A | 1/2017 |

(Continued)

OTHER PUBLICATIONS

Notification of Transmittal of Copies of Translation of the International Preliminary Report on Patentability (Form PCT/IB/338) issued in counterpart International application No. PCT/JP2020/033601 mailed Mar. 31, 2022 with Forms PCT/IB/373 and PCT/ISA/237, with English translation. (10 pages).

(Continued)

*Primary Examiner* — Romain Jeanty
(74) *Attorney, Agent, or Firm* — WHDA, LLP

(57) ABSTRACT

An information processing device includes an estimation unit estimating the number of persons in a facility based on a first number of MAC addresses counted based on first information about MAC addresses collected from radio waves transmitted by first terminals during a first time period, and a learned model, and a determination unit determining a third number of MAC addresses changing randomly, from the first number based on a first half of each of the MAC addresses. The learned model is generated by machine learning teacher data defining a relationship between a second number of MAC addresses counted based on second information about MAC addresses collected from radio waves transmitted from second terminals in the facility during a second time period, and the actual number of persons in the facility. The estimation unit estimates part of (Continued)

the number of the persons based on the third number and the learned model.

10 Claims, 14 Drawing Sheets

(56) References Cited

U.S. PATENT DOCUMENTS

| | | | | |
|---|---|---|---|---|
| 2007/0038360 | A1* | 2/2007 | Sakhpara | G08G 1/09675 701/469 |
| 2010/0262430 | A1* | 10/2010 | Gips | G08B 21/24 705/2 |
| 2011/0158187 | A1* | 6/2011 | Komamura | H04W 72/52 370/329 |
| 2011/0201354 | A1* | 8/2011 | Park | H04W 84/047 455/456.1 |
| 2012/0046026 | A1* | 2/2012 | Chande | H04W 52/18 455/422.1 |
| 2012/0296686 | A1* | 11/2012 | Fugman | H04M 3/42348 705/26.61 |
| 2013/0018629 | A1* | 1/2013 | Sidhu | G01S 19/49 702/150 |
| 2013/0084884 | A1* | 4/2013 | Teyeb | H04W 48/04 455/456.1 |
| 2013/0157684 | A1* | 6/2013 | Moser | H04W 4/023 455/456.1 |
| 2015/0089424 | A1* | 3/2015 | Duffield | G06F 3/0484 715/771 |
| 2015/0215797 | A1* | 7/2015 | Yoshimi | G06Q 50/10 370/252 |
| 2018/0376289 | A1 | 12/2018 | Maezawa et al. | |
| 2020/0133955 | A1* | 4/2020 | Padmanabhan | G06Q 30/01 |

FOREIGN PATENT DOCUMENTS

| | | |
|---|---|---|
| JP | 2017-037476 A | 2/2017 |
| JP | 2017-117107 A | 6/2017 |
| WO | 2014/034707 A1 | 3/2014 |

OTHER PUBLICATIONS

Fukuzaki, Takeo et al., "Statistical Real Number Analysis in Wi-Fi Packet Human Flow Sensing", Information Processing Society of Japan, Multimedia, Distributed, Cooperative, and Mobile Symposium (DICOMO0215), vol. 2015, Issue 1, pp. 7-14, Jul. 8, 2015, with English Abstract; Cited in ISR and JP Office Action dated Jan. 14, 2020. (9 pages).

Nakata, Satoshi et al., "Congestion Degree Estimation using Probe Request in Wireless LAN", IPSJ SIG Technical Reports, vol. 2018, Issue DPS-175, No. 1, pp. 1-7, May 2018, with English Abstract; Cited in ISR. (7 pages).

International Search Report dated Nov. 2, 2020, issued in counterpart Application No. PCT/JP2020/033601, with English Translation. (13 pages).

Notice of Reason for Refusal dated Jan. 14, 2020, issued in counterpart JP Application No. 2019-171640, with English translation. (11 pages).

* cited by examiner

| EVALUATION DATE | Y1/M1/D1 | Y2/M2/D2 |
|---|---|---|
| EVALUATION TIME PERIOD | T1-T2 | T1-T2 |
| EVALUATION FACILITY | SHOP A | SHOP B |
| NUMBER OF PIECES OF POS DATA | P1 | P2 |
| ESTIMATED NUMBER OF STAYING PERSONS | G1=N1a×$\alpha$1+N1b+N1c (P1∈$\alpha$1) | G2=N2a×$\alpha$2+N2b+N2c (P2∈$\alpha$2) |
| ACTUAL NUMBER OF STAYING PERSONS | G1´ | G2´ |
| CAPTURE RATE (%) | (G1÷G1´)×100<115 (%) | (G2÷G2´)×100>85 (%) |

Na1, N2a: TOTAL NUMBER OF MAC ADDRESSES THAT CHANGE
N1b, N2b: TOTAL NUMBER OF FIXED MAC ADDRESSES
N1c, N2c: TOTAL NUMBER OF PERSONS CARRYING NO MOBILE TERMINAL
$\alpha$1, $\alpha$2: LEARNED MODEL

| TIME ATTRIBUTION | | FACILITY ATTRIBUTION | AREA ATTRIBUTION |
|---|---|---|---|
| DAY CLASSI-FICATION | TIME PERIOD | | |
| WEEKDAY | MIDMORNING | | |
| MONDAY TO FRIDAY | GOING-TO-WORK HOURS | SMALL-SCALE COMMERCIAL FACILITY | OFFICE DISTRICT |
| WEEKDAY | LEAVING-WORK HOURS | SMALL-SCALE COMMERCIAL FACILITY | OFFICE DISTRICT |
| . . | . . | SMALL-SCALE COMMERCIAL FACILITY | ENTERTAINMENT DISTRICT |
| SATURDAY, SUNDAY | DAYTIME HOURS | MEDIUM-SCALE COMMERCIAL FACILITY | . . |
| WEEKDAY | AROUND 15 O'CLOCK | MEDIUM-SCALE COMMERCIAL FACILITY | RESIDENTIAL AREA |
| SATURDAY, SUNDAY | NIGHT-TIME PERIOD | LARGE-SCALE COMMERCIAL FACILITY | SIGHTSEEING AREA |
| HOLIDAY | . . | AMUSEMENT FACILITY | IN FRONT OF LOCAL STATION |
| | | ATHLETIC FACILITY | |
| | | | . . |

INFORMATION PROCESSING DEVICE, INFORMATION PROCESSING METHOD, AND SYSTEM

TECHNICAL FIELD

The present invention relates to an information processing device, an information processing method, and a system.

BACKGROUND ART

There is known a technique for estimating the number of users using a facility such as a restaurant by analyzing information such as media access control (MAC) addresses assigned to mobile terminals (see, for example, Patent Document 1). In addition, various techniques for determining the number of mobile terminals using the number of MAC addresses assigned to the mobile terminals are known (see, for example, Patent Documents 2 to 4).

PRIOR ART DOCUMENT

Patent Document

Patent Document 1: Japanese Patent Application Publication No. 2017-022505
Patent Document 2: Japanese Patent Application Publication No. 2017-037476
Patent Document 3 Japanese Patent Application Publication No. 2017-117107
Patent Document 4: Japanese Patent Application Publication No. 2013-235511

SUMMARY OF THE INVENTION

Problem to be Solved by the Invention

Some models of various terminals including mobile terminals may have a function to randomly change the MAC address and transmit it (hereinafter, referred to as a randomization function). In the case that a terminal has the randomization function, when the randomization function is enabled in the setting of the terminal, the MAC address randomly changes every tens of seconds and is transmitted. In the case that the MAC address randomly changes, there is a possibility that the number of persons in the facility is not estimated accurately by simply analyzing information such as MAC addresses.

In one aspect, an objective is to estimate the number of persons in a facility accurately even when randomly changing MAC addresses are mixed in MAC addresses.

Means for Solving the Problem

In one embodiment, an information processing device is an information processing device including a collection unit configured to collect first information about media access control (MAC) addresses from radio waves transmitted by first terminals carried by persons staying in a facility during a first time period, an estimation unit configured to estimate the number of the persons staying based on a first total number of MAC addresses, which can be counted based on the first information, and a learned model, and a determination unit configured to determine a third total number of predetermined MAC addresses that change randomly, from the first total number based on a first half of each of the MAC addresses, wherein: the learned model is generated by machine learning a plurality of sets of teacher data each defining a relationship between a second total number of MAC addresses, which can be counted based on second information about MAC addresses collected from radio waves transmitted from second terminals in the facility during a second time period prior to the first time period, and the number of persons who actually stayed in the facility, and the estimation unit is configured to estimate part of the number of the persons staying based on the third total number determined by the determination unit and the learned model.

In another embodiment, an information processing device is an information processing device including a collection unit configured to collect first information about media access control (MAC) addresses from radio waves transmitted from first terminals carried by persons staying in a facility during a first time period, and an estimation unit configured to estimate the number of the persons staying based on a first total number of MAC addresses, which can be counted based on the first information, and a learned model, wherein: the learned model is generated by machine-learning a plurality of sets of teacher data each defining a relationship among a second total number of MAC addresses, which can be counted based on second information about MAC addresses collected from radio waves transmitted from second terminals in the facility during a second time period prior to the first period, the number of purchasers who made a purchase in the facility during the second time period, and the number of persons who actually stayed in the facility.

In the above configuration, a generation unit configured to determine the number of the persons staying estimated based on the first total number and the learned model as the number of the first terminals under an assumption that all the persons who actually stayed carry the second terminals may be included.

In the above configuration, the learned model may be generated by machine learning the plurality of sets of teacher data each further defining at least one of the following attributions: an attribution of time when the number of the persons staying is estimated, an attribution of the facility, and an attribution of an area where the facility is located, and the estimation unit may be configured to estimate the number of the persons staying based on the first total number, an attribution corresponding to the at least one, and the learned model.

In the above configuration, the learned model may be generated by machine learning the plurality of sets of teacher data each further defining all of the following attributions: an attribution of time when the number of the persons staying is estimated, an attribution of the facility, and an attribution of an area where the facility is located, and the estimation unit may be configured to estimate the number of the persons staying based on the first total number, attributions corresponding to the all, and the learned model.

In the above configuration, the radio waves may be scanning radio waves for searching a repeater for a wireless local area network (LAN).

In another embodiment, an information processing method is implemented by a computer executing a process including: collecting first information about media access control (MAC) addresses from radio waves transmitted from first terminals carried by persons staying in a facility during a first time period, and estimating the number of the persons staying based on a first total number of MAC addresses, which can be counted based on the first information, and a learned model, the learned model is generated by machine learning a plurality of sets of teacher data each defining a relationship between a second total number of MAC addresses, which can be counted based on second information about MAC addresses collected from radio waves transmitted from second terminals in the facility during a second time period prior to the first time period, and the number of persons who actually stayed in the facility, and in the process, a third total number of predetermined MAC addresses that randomly change is determined from the first total number based on a first half of each of MAC addresses, and part of the number of the persons staying is estimated based on the third total number and the learned model.

In another embodiment, an information processing method is implemented by a computer executing a process including: collecting first information about media access control (MAC) addresses from radio waves transmitted from first terminals carried by persons staying in a facility during a first time period, and estimating the number of the persons staying based on a first total number of MAC addresses, which can be counted based on the first information, and a learned model, and the learned model is generated by machine learning a plurality of sets of teacher data each defining a relationship among a second total number of MAC addresses, which can be counted based on second information about MAC addresses collected from radio waves transmitted from second terminals in the facility during a second time period prior to the first time period, the number of purchasers who made a purchase in the facility during the second time period, and the number of persons who actually stayed in the facility.

In another embodiment, a system is a system including a receiver and an information processing device, wherein: the receiver is configured to: generate first information about media access control (MAC) addresses from radio waves transmitted from first terminals carried by persons staying in a facility during a first time period, and when receiving a second radio wave transmitted from a second terminal in the facility during a second time period prior to the first time period, generate second information about a MAC address from the second radio wave, the information processing device is configured to collect the first information through the receiver, and estimate the number of the persons staying based on a first total number of MAC addresses, which can be counted based on the first information, and a learned model, the learned model is generated by machine learning a plurality of sets of teacher data each defining a relationship between a second total number of MAC addresses, which can be counted based on the second information, and the number of persons who actually stayed in the facility, and the information processing device is configured to determine a third total number of predetermined MAC addresses that randomly change from the first total number based on a first half of each of MAC addresses and estimate part of the number of the persons staying based on the third total number and the learned model.

In another embodiment, a system is a system including a receiver and an information processing device, wherein: the receiver is configured to: generate first information about media access control (MAC) addresses from radio waves transmitted from first terminals carried by persons staying in a facility during a first time period, and when receiving a second radio wave transmitted from a second terminal in the facility during a second time period prior to the first time period, generate second information about a MAC address from the second radio wave, the information processing device is configured to collect the first information through the receiver, and estimate the number of the persons staying based on a first total number of MAC addresses, which can be counted based on the first information, and a learned model, and the learned model is generated by machine learning a plurality of sets of teacher data each defining a relationship among a second total number of MAC addresses, which can be counted based on the second information, the number of purchasers who made a purchase in the facility during the second time period, and the number of persons who actually stayed in the facility.

Effects of the Invention

The number of persons in a facility can be estimated accurately even when randomly changing MAC addresses are mixed in MAC addresses.

BRIEF DESCRIPTION OF THE DRAWINGS

FIG. 9 illustrates a correlation;

FIG. 13 is a diagram for describing a time attribution, a facility attribution, and an area attribution.

MODES FOR CARRYING OUT THE INVENTION

Hereinafter, a description will be given of embodiments of the present disclosure with reference to the accompanying drawings.

First Embodiment

Figure 1A:
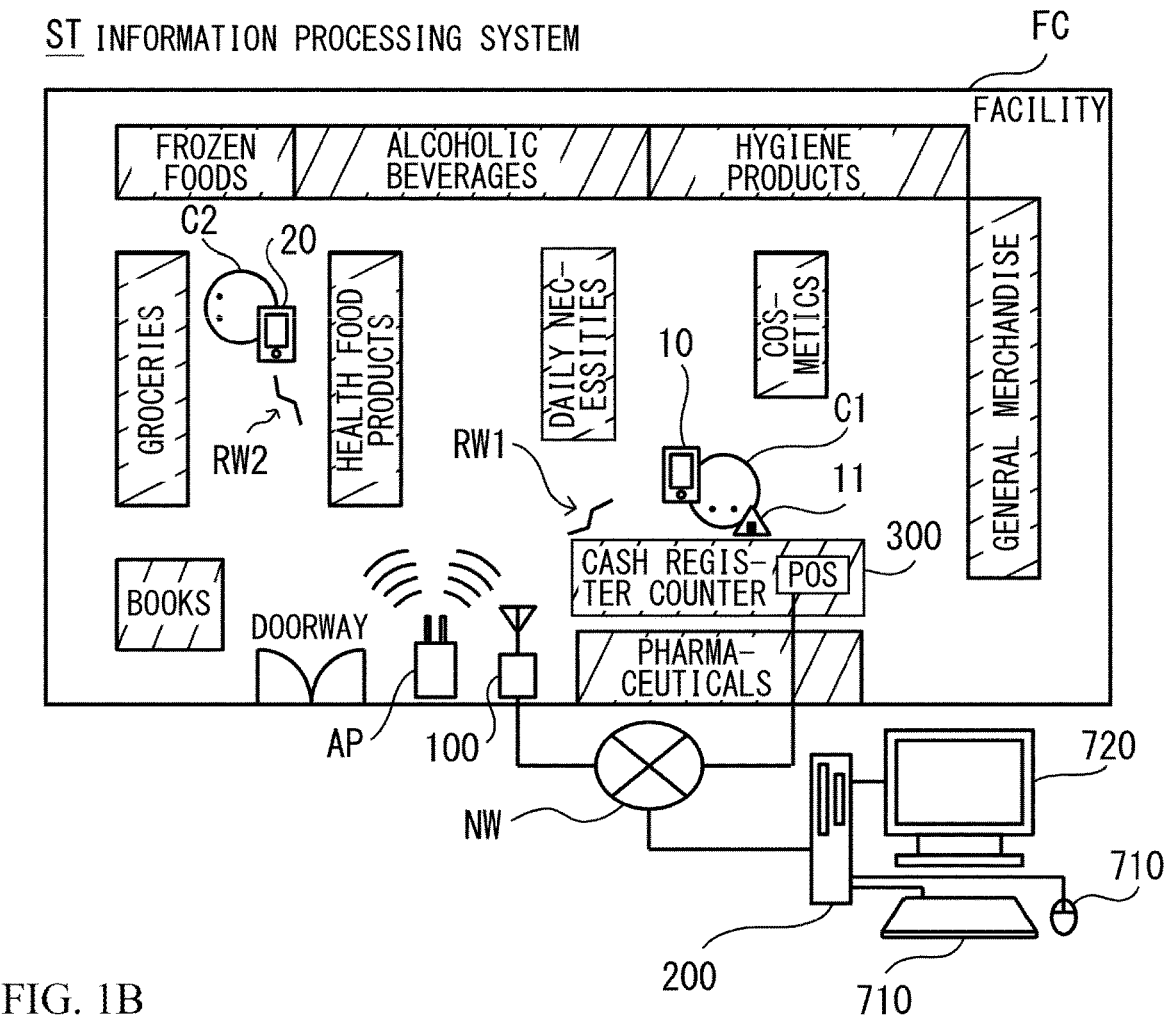
FIG. 1A is a diagram for describing an example of an information processing system.
Figure 1B:
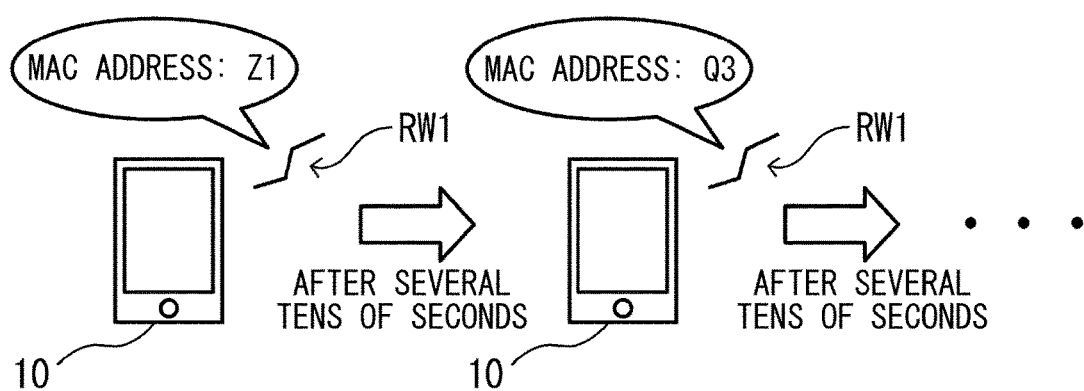
FIG. 1B is a diagram for describing change of a MAC address.

FIG. 1A is a diagram for describing an example of an information processing system ST. FIG. 1B is a diagram for describing change of a MAC address. The information processing system ST is a computer system that includes a communication device 100 as a receiver and a server (hereinafter, referred to as an information processing server) 200 as an information processing device. An input device 710 and a display device 720 are coupled to the information processing server 200. Examples of the input device 710 include a keyboard and a mouse. Examples of the display device 720 include a liquid crystal display.

The information processing server 200 is coupled to the communication device 100 and a point of sales (POS) terminal 300 through a communication network NW. Examples of the communication network NW include a local area network (LAN) and the Internet. The communication device 100 and the POS terminal 300 are installed in a facility FC. Particularly, the POS terminal 300 is installed in a cash register counter of the facility FC as illustrated in FIG. 1A. On the other hand, the communication device 100 may be installed in any location including the cash register counter in the facility FC, but is preferably installed near an access point AP, which is a repeater of a wireless LAN such as Wi-Fi (registered trademark).

FIG. 1A illustrates a small-scale commercial facility such as a drugstore or a convenience store as an example of the facility FC, but coffee shops or restaurants may be employed as the small-scale commercial facility. The facility FC is not limited to the small-scale commercial facility, and may be a medium-scale commercial facility or a large-scale commercial facility. Examples of the medium-scale commercial facility include hardware stores and supermarkets. Examples of the large-scale commercial facility include department stores and shopping malls. Amusement facilities such as video game arcades, athletic facilities such as baseball parks and football stadiums, medical facilities such as hospitals and health clinics, and public facilities such as stations and airports may be employed as the facility FC.

As illustrated in FIG. 1A, when persons C1 and C2 who are staying in the facility FC carry mobile terminals 10 and 20, respectively, the mobile terminals 10 and 20 periodically transmit scanning radio waves RW1 and RW2 for searching the access point AP, respectively. Although it is not illustrated, there may be a person who is staying in the facility FC without carrying the mobile terminals 10 and 20 and the like (not illustrated).

The communication device 100 receives the radio waves RW1 and RW2 transmitted from the mobile terminals 10 and 20, respectively, and generates log information of the MAC addresses corresponding to the mobile terminals 10 and 20 based on the received radio waves RW1 and RW2. That is, the radio wave RW1 contains the MAC address corresponding to the mobile terminal 10, while the radio wave RW2 contains the MAC address corresponding to the mobile terminal 20. When the communication device 100 generates the log information, the communication device 100 transmits (uploads) the log information to the information processing server 200. Since the communication device 100 receives the radio waves RW1 and RW2, the communication device 100 is preferably installed near the access point AP.

Depending on the models of the mobile terminals 10 and 20, the MAC addresses can be randomly changed according to the settings of the mobile terminals 10 and 20. When the mobile terminals 10 and 20 are set to change the MAC addresses randomly, the mobile terminals 10 and 20 transmit the radio waves RW1 and RW2 containing the MAC addresses that change periodically. For example, in the case that the mobile terminal 10 is a model that can randomly change the MAC address, according to the setting of the mobile terminal 10, the mobile terminal 10 transmits the radio waves RW1 containing different MAC addresses every tens of seconds as illustrated in FIG. 1B.

In FIG. 1B, the MAC address "Z1" and the MAC address "Q3" are illustrated as examples, but the MAC address consists of 6 bytes (48 bits). In FIG. 1A, smartphones are illustrated as examples of the mobile terminals 10 and 20, but the mobile terminals 10 and 20 are not limited to smartphones, and may be tablet terminals, smart devices such as smartwatches, or portable gaming devices.

The POS terminal 300 generates a set of POS data every purchase when the staying person C1 purchases a product 11, and transmits (uploads) the generated set of POS data to the information processing server 200. The information processing server 200 collects the log information described above, and also obtains the POS data to perform various processes. For example, the information processing server 200 counts the number of sets of the POS data to identify the actual number of purchasers in the facility FC from among staying persons, and uses various information that can be extracted from the log information together with the number of purchasers to generate teacher data required for generating a learned model. In some embodiments, the information processing server 200 may obtain no POS data, and in this case, the information processing server 200 generates teacher data required for generating a learned model using various information that can be extracted from the log information. Hereinafter, the details of the processes executed by the information processing server 200 will be described.

Next, with reference to FIG. 2, a hardware configuration of the communication device 100 will be described.

Figure 2:
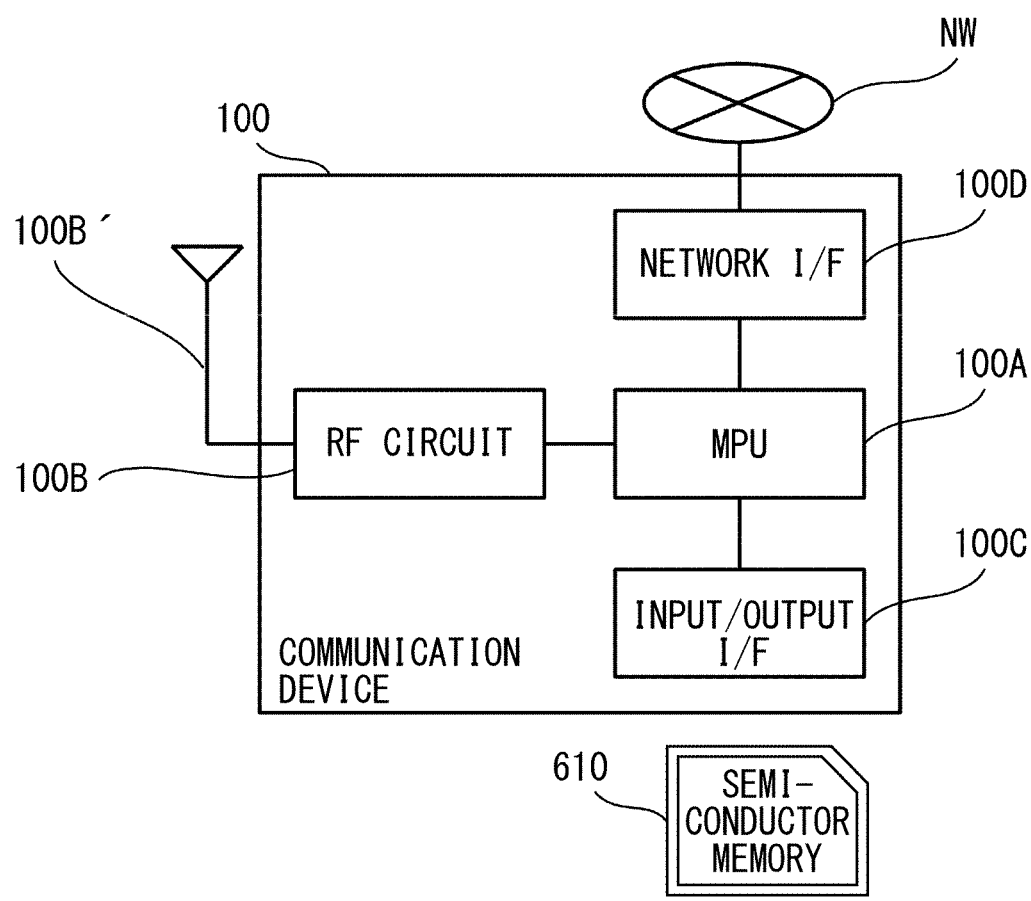
FIG. 2 illustrates a hardware configuration of a communication device.

FIG. 2 illustrates a hardware configuration of the communication device 100. As illustrated in FIG. 2, the communication device 100 includes a micro processing unit (MPU) 100A and a radio frequency (RF) circuit 100B. An antenna 100B' is coupled to the RF circuit 100B. In addition, the communication device 100 includes an input/output interface (I/F) 100C and a network I/F 100D. A semiconductor memory 610 is coupled to the input/output I/F 100C. Examples of the semiconductor memory 610 include a nonvolatile memory such as a memory card. The network I/F 100D includes a LAN port and a communication circuit, and is coupled to the communication network NW.

The MPU 100A are coupled to the RF circuit 100B, the input/output I/F 100C, and the network I/F 100D. The MPU 100A includes a central processing unit (CPU) as a processor and a random access memory (RAM) as a memory, and implements the process of the computer by the CPU and the RAM cooperatively working. For example, when a program stored in the semiconductor memory 610 is temporarily stored in the RAM and the CPU executes the stored program, the MPU 100A implements various types of functions described later, and executes various types of processes described later. The program is according to the flowchart described later.

Figure 3:
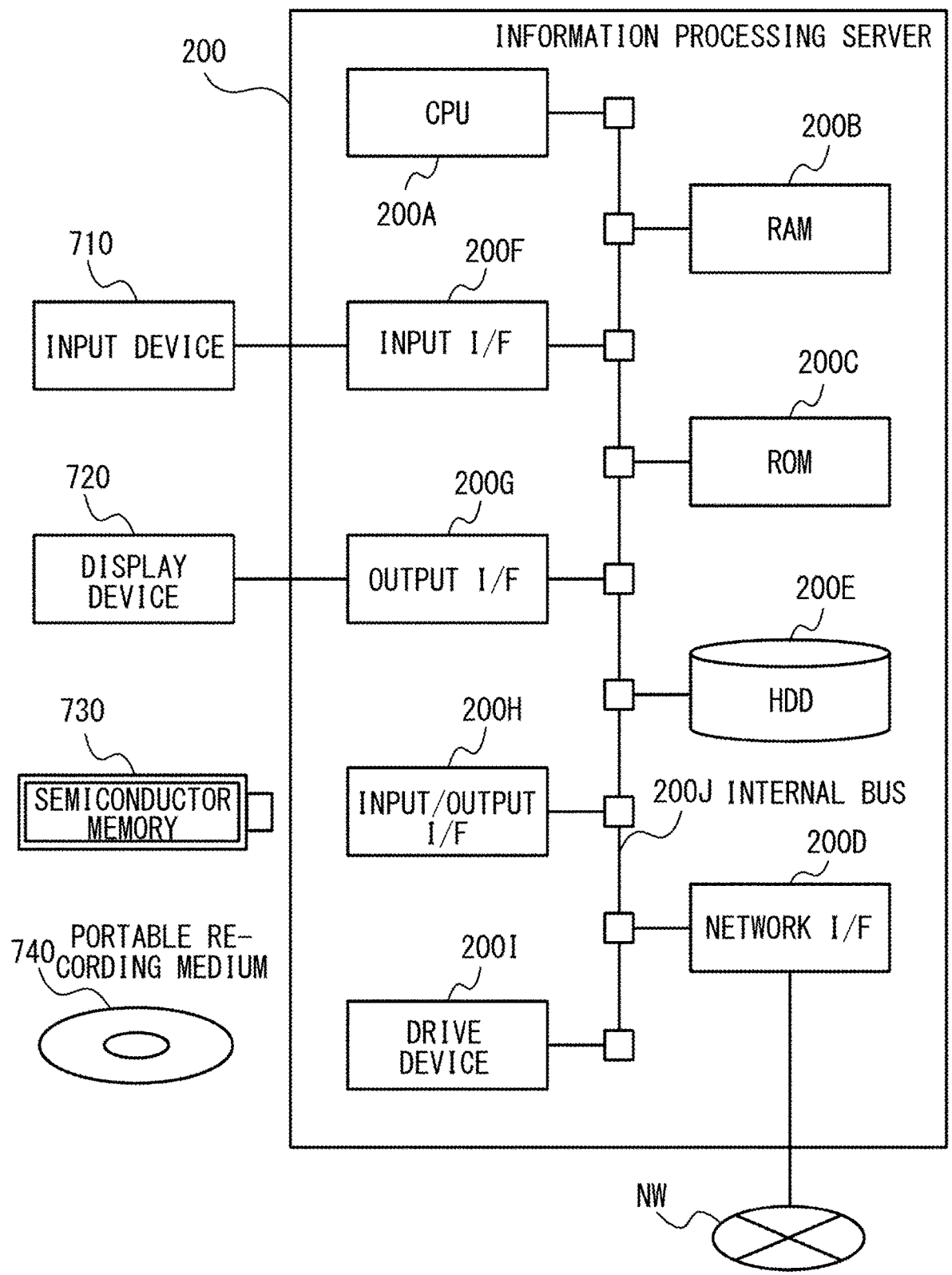
FIG. 3 illustrates a hardware configuration of an information processing server.

With reference to FIG. 3, a hardware configuration of the information processing server 200 will be described.

FIG. 3 illustrates a hardware configuration of the information processing server 200. As illustrated in FIG. 3, at least, the information processing server 200 includes a CPU 200A, a RAM 200B, a read only memory (ROM) 200C, and a network I/F 200D. The information processing server 200 may include at least one of a hard disk drive (HDD) 200E, an input I/F 200F, an output I/F 200G, an input/output I/F 200H, and a drive device 200I as necessary. The CPU 200A to the drive device 200I are connected to each other through an internal bus 200J. That is, the information processing server 200 is implemented by the computer.

The input device 710 is coupled to the input I/F 200F. The display device 720 is coupled to the output I/F 200G. A semiconductor memory 730 is coupled to the input/output I/F 200H. Examples of the semiconductor memory 730 include a nonvolatile memory such as a universal serial bus (USB) memory and a flush memory. The input/output I/F 200H reads programs and data stored in the semiconductor memory 730. The input I/F 200F and the input/output I/F 200H include, for example, USB ports. The output I/F 200G includes, for example, a display port.

A portable recording medium 740 is inserted into the drive device 200I. Examples of the portable recording medium 740 include removal discs such as a compact disc (CD)-ROM and a digital versatile disc (DVD). The drive device 200I reads programs and data stored in the portable recording medium 740. The network I/F 200D includes, for example, a LAN port and a communication circuit. The network I/F 200D is coupled to the communication network NW.

The CPU 200A causes programs stored in the ROM 200C, the HDD 200E, or the semiconductor memory 730 to be temporarily stored in the RAM 200B. The CPU 200A causes programs stored in the portable recording medium 740 to be temporarily stored in the RAM 200B. Execution of the stored program by the CPU 200A causes the CPU 200A to implement various types of functions described later and execute various types of processes described later. The program is according to the flowchart described later.

A description will next be given of a functional configuration of the communication device 100 with reference to FIG. 4.

Figure 4:
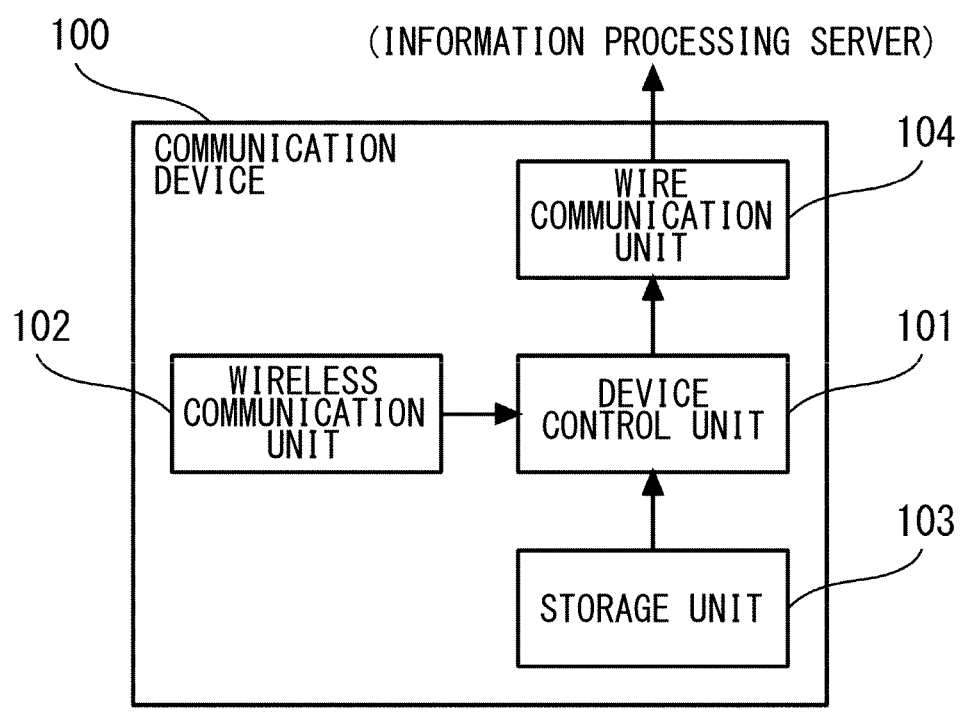
FIG. 4 is a functional block diagram of the communication device.

FIG. 4 is a functional block diagram of the communication device 100. As illustrated in FIG. 4, the communication device 100 includes a device control unit 101, a wireless communication unit 102, a storage unit 103, and a wire communication unit 104 as its components. The device control unit 101 can be implemented by the MPU 100A. The wireless communication unit 102 can be implemented by the RF circuit 100B and the antenna 100B'. The storage unit 103 can be implemented by the input/output I/F 100C and the semiconductor memory 610. The wire communication unit 104 can be implemented by the network I/F 100D. The details of the functions implemented by the components of the communication device 100 will be described when the operation of the communication device 100 is described.

Figure 5:
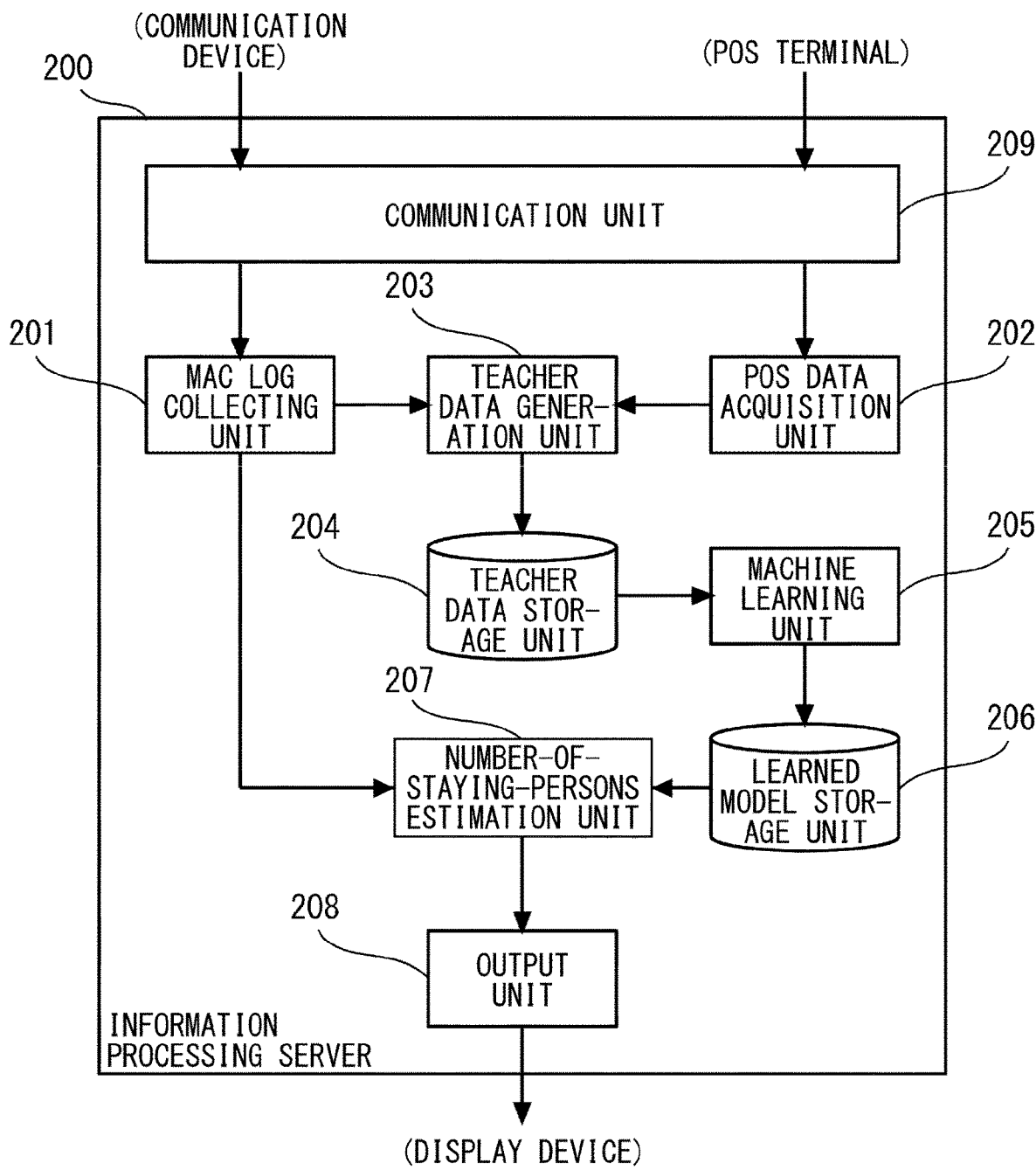
FIG. 5 is a functional block diagram of the information processing server in accordance with a first embodiment.

With reference to FIG. 5, a functional configuration of the information processing server 200 will be described.

FIG. 5 is a functional block diagram of the information processing server 200 in accordance with the first embodiment. As illustrated in FIG. 5, the information processing server 200 includes a MAC log collecting unit 201, a POS data acquisition unit 202, a teacher data generation unit 203, and a teacher data storage unit 204 as its components. The information processing server 200 also includes a machine learning unit 205, a learned model storage unit 206, a number-of-staying-persons estimation unit 207, an output unit 208, and a communication unit 209. The MAC log collecting unit 201 corresponds to a collection unit, and the number-of-staying-persons estimation unit 207 corresponds to an estimation unit.

The MAC log collecting unit 201, the POS data acquisition unit 202, the teacher data generation unit 203, the machine learning unit 205, and the number-of-staying-persons estimation unit 207 are implemented by the CPU 200A. The teacher data storage unit 204 and the learned model storage unit 206 can be implemented by the RAM 200B or the HDD 200E. The output unit 208 can be implemented by the output I/F 200G. The communication unit 209 can be implemented by the network I/F 200D. The details of the functions implemented by the components of the information processing server 200 will be described when the operation of the information processing server 200 is described.

Next, the operation of the information processing system ST will be described.

Figure 6:
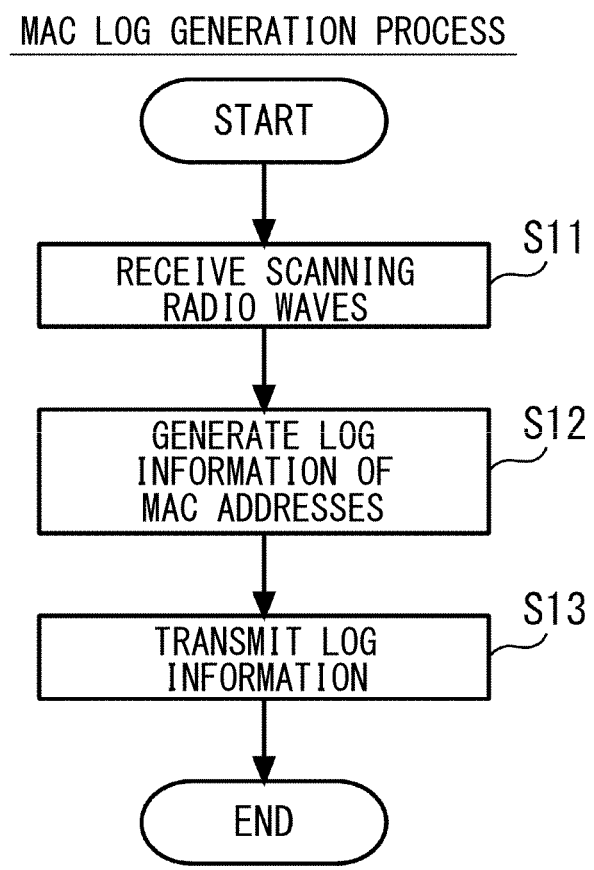
FIG. 6 is a flowchart illustrating a MAC log generation process.

First, with reference to FIG. 6, the operation of the communication device 100 will be described. FIG. 6 is a flowchart illustrating a MAC log generation process. The MAC log generation process is a process of generating log information about MAC addresses, and is executed by the communication device 100. As illustrated in FIG. 6, the wireless communication unit 102 receives scanning radio waves (step S11). In more detail, the wireless communication unit 102 periodically receives the scanning radio waves RW1 and RW2 (see FIG. 1A) transmitted from the mobile terminals 10 and 20, respectively. The scan may be active scan or passive scan. When the wireless communication unit 102 receives the radio waves RW1 and RW2, the wireless communication unit 102 converts the received radio waves RW1 and RW2 to a first electric signal according to the radio wave RW1 and a second electric signal according to the radio wave RW2, respectively, and outputs them to the device control unit 101.

As described above, the radio waves RW1 and RW2 contain the MAC addresses corresponding to the mobile terminals 10 and 20, respectively. In addition to the MAC addresses, the radio waves RW1 and RW2 also contain radio field strengths at the time when the mobile terminals 10 and 20 received radio waves transmitted from the access point AP, respectively. More specifically, the radio wave RW1 contains the received signal strength indicator (RSSI) of the mobile terminal 10 as the radio field strength, while the radio wave RW2 contains the RSSI of the mobile terminal 20 as the radio field strength. Therefore, the first electric signal contains the MAC address and the RSSI of the mobile terminal 10, at least, while the second electric signal contains the MAC address and the RSSI of the mobile terminal 20, at least.

When the wireless communication unit 102 receives scanning radio waves, the device control unit 101 generates the log information of the MAC addresses (step S12). More specifically, the device control unit 101 receives the first electric signal and the second electric signal output from the wireless communication unit 102, and generates the log information based on the received first electric signal and the received second electric signal, and the specific program stored in the storage unit 103. That is, the specific program is a program generating the log information of the MAC addresses based on the first electric signal and the second electric signal. As described above, since each of the first electric signal and the second electric signal contains the MAC address and the RSSI, the device control unit 101 generates the log information containing the MAC address, the RSSI, the reception date and time, and the like.

Here, since the wireless communication unit 102 receives the radio waves RW1 and RW2 periodically, the device control unit 101 receives the first electric signal and the second electric signal periodically. As described above, depending on the models of the mobile terminals 10 and 20, the MAC address can be randomly changed according to the settings of the mobile terminals 10 and 20. Thus, the MAC address of the first electric signal periodically received by the device control unit 101 may be different from the MAC address of the first electric signal that was previously received. On the other hand, depending on the models or settings of the mobile terminals 10 and 20, the MAC address may be fixed. In this case, the MAC addresses of the first electric signal and the second electric signal periodically received by the device control unit 101 do not change. Therefore, some radio waves RW1 and RW2 transmitted from the mobile terminals 10 and 20 do not necessarily contain the MAC addresses that do not change, and various types of MAC addresses may be mixed. The device control unit 101 generates the log information containing the MAC address, the RSSI, and the reception date and time, and outputs it to the wire communication unit 104 even when various types of MAC addresses are mixed.

When the device control unit 101 generates the log information of the MAC addresses, the wire communication unit 104 transmits the log information (step S13). In more detail, the wire communication unit 104 transmits the log information output from the device control unit 101, to the information processing server 200. The timing when the wire communication unit 104 transmits the log information can be freely set. For example, depending on the setting, the wire communication unit 104 may transmit the log information containing the MAC addresses during 24 hours at midnight, or may transmit the log information containing the MAC addresses during one month at the end of the month. The transmission timing may be every several hours (for example, 3 hours, 6 hours, or 12 hours). As the wire communication unit 104 transmits the log information, the log information is accumulated in the information processing server 200.

Figure 7A:
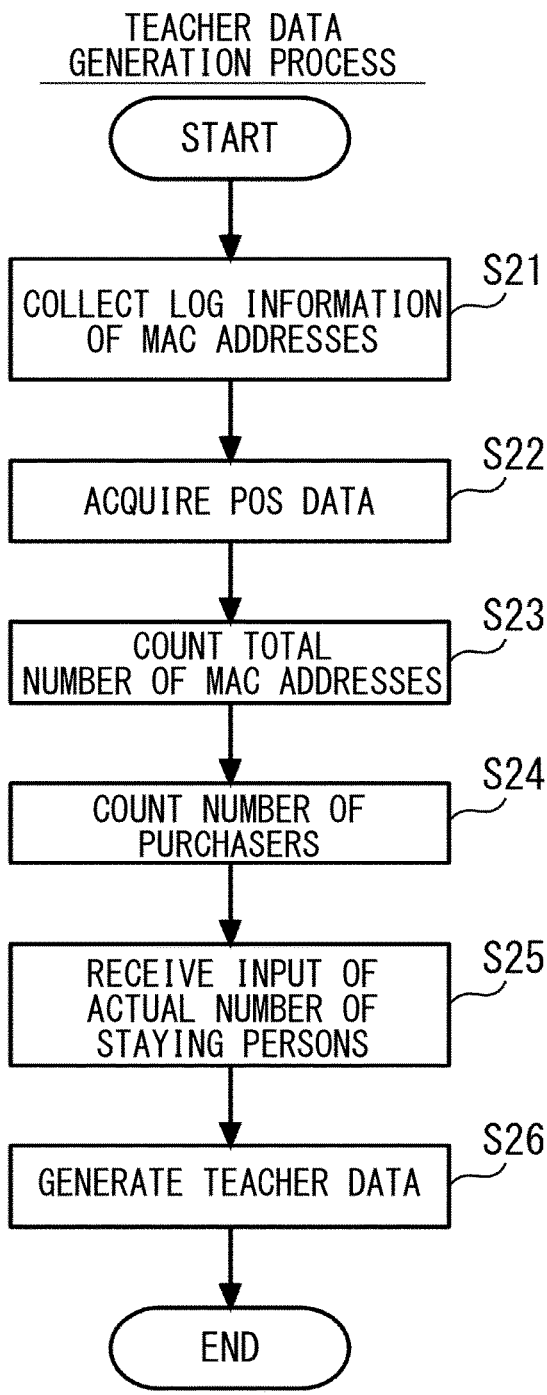
FIG. 7A is a flowchart illustrating a teacher data generation process.
Figure 7B:
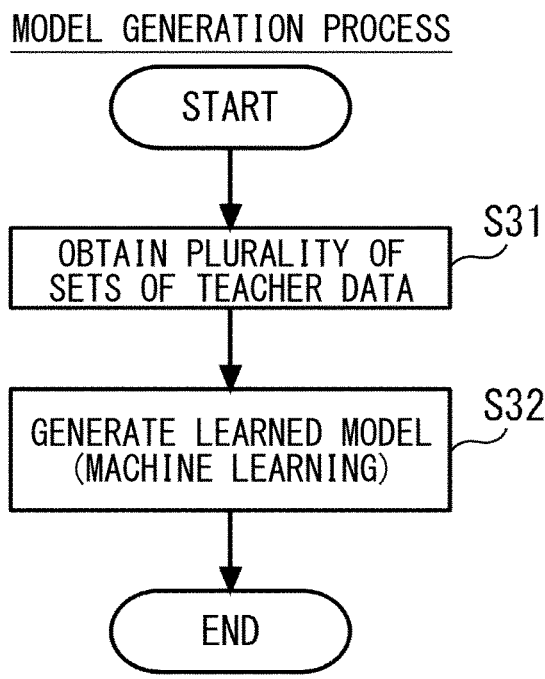
FIG. 7B is a flowchart illustrating a model generation process.
Figure 8:
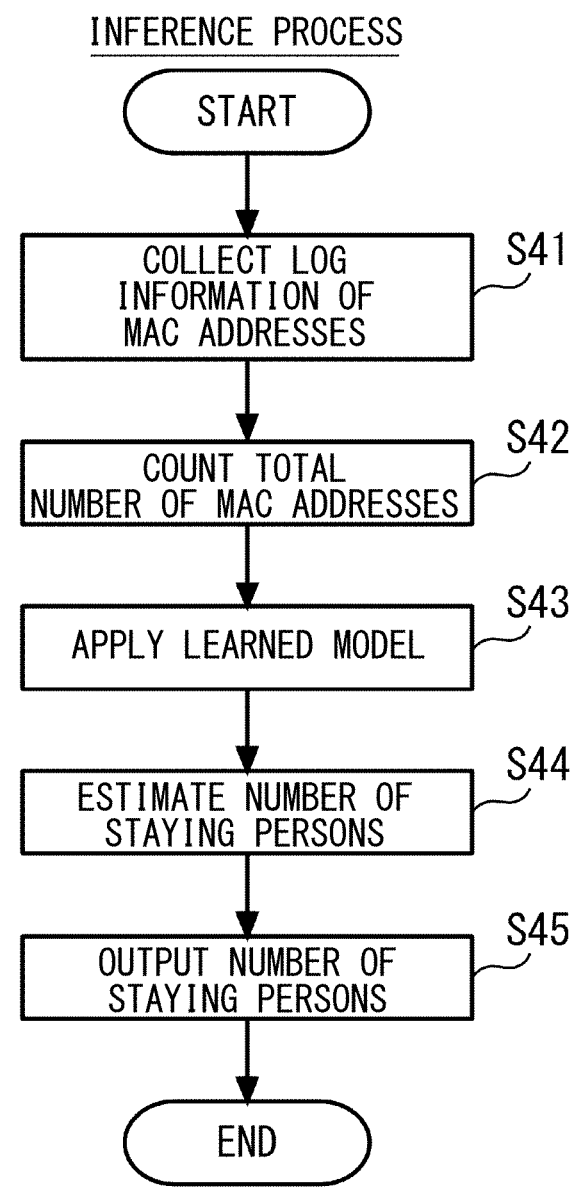
FIG. 8 is a flowchart illustrating an inference process.

With reference to FIG. 7A and FIG. 7B and FIG. 8, the operation of the information processing server 200 in accordance with the first embodiment will be described.

FIG. 7A is a flowchart illustrating a teacher data generation process. The teacher data generation process is a process of generating teacher data required to generate a learned model, and is executed by the information processing server 200. As illustrated in FIG. 7A, the MAC log collecting unit 201 collects the log information of the MAC addresses (step S21). In more detail, when the log information transmitted from the communication device 100 is received by the communication unit 209, the MAC log collecting unit 201 collects the log information from the communication unit 209. During a model generation period prior to an inference period described later, when the MAC log collecting unit 201 collects the log information, the MAC log collecting unit 201 outputs the collected log information to the teacher data generation unit 203.

After the MAC log collecting unit 201 collects the log information, the POS data acquisition unit 202 acquires POS data (step S22). In more detail, when the MAC log collecting unit 201 collects the log information, the MAC log collecting unit 201 notifies the POS data acquisition unit 202 of an acquisition request of the POS data. This causes the POS data acquisition unit 202 to transmit a transmission request of the POS data to the POS terminal 300, and acquires the POS data transmitted from the POS terminal 300 according to the transmission request, through the communication unit 209. When the POS data acquisition unit 202 acquires the POS data, the POS data acquisition unit 202 outputs the acquired POS data to the teacher data generation unit 203. When the MAC log collecting unit 201 does not notify of the above acquisition request according to the setting of the information processing server 200 or wiring, the POS data acquisition unit 202 skips the process of step S22. This avoids the acquisition of the POS data.

When the process of step S22 is completed, the teacher data generation unit 203 counts the total number of MAC addresses (step S23). In more detail, when the teacher data generation unit 203 receives the POS data output from the POS data acquisition unit 202, the teacher data generation unit 203 counts the total number of MAC addresses for each RSSI based on the log information received before receiving the POS data. Since the teacher data generation unit 203 receives the log information before receiving the POS data, the teacher data generation unit 203 may count the total number of MAC addresses for each RSSI based on the log information before receiving the POS data.

As described above, various types of MAC addresses are mixedly contained in the log information. Therefore, more than the number of the mobile terminals 10 and 20 may be counted when the total number of MAC addresses is simply counted. For example, in the case that the mobile terminal 20 does not have the randomization function of the MAC address, when a MAC address is uniquely assigned to the mobile terminal 20, the total number of MAC addresses for one mobile terminal 20 is counted as one. However, when the mobile terminal 10 has the randomization function of the MAC address and the randomization function is fulfilled, the total number of MAC addresses for one mobile terminal 10 may be counted as three. In this case, the total number of MAC addresses for two mobile terminals 10 and 20 is counted as four. As seen from the above, it is not simply estimated that the number of the mobile terminals 10 and 20 in the facility FC is four and the number of persons staying in the facility FC is four because the total number of MAC addresses is four.

Therefore, the teacher data generation unit 203 extracts fixed MAC addresses from among all the MAC addresses using the fact that the 22 bits (the first half), excluding the first 2 bits, of the first 24 bits of the MAC address consisting of 48 bits (6 bytes) represent the identification information of the mobile terminal manufacturer at the stage of step S23. When the teacher data generation unit 203 counts the total number of the extracted MAC addresses, the number of mobile terminals (not illustrated) that do not have the randomization function, such as the mobile terminal 20, can be determined. In addition, the teacher data generation unit 203 can use the determined number of the mobile terminals as part of the number of persons staying in the facility FC. The teacher data generation unit 203, in conjunction with the extraction of the fixed MAC addresses, calculates the time spent in the facility FC of each of the mobile terminals to which the fixed MAC addresses are assigned, based on the difference between the appearance date and time and the disappearance date and time of the MAC address.

On the other hand, the remaining MAC addresses after the extraction of the fixed MAC addresses from among all the MAC addresses, can be identified as the MAC addresses changing dynamically because of the randomization function. Therefore, it is estimated how many mobile terminals the total number of the remaining MAC addresses correspond to.

When the process of step S23 is completed, the teacher data generation unit 203 counts the number of purchasers (step S24). In more detail, when the teacher data generation unit 203 receives the POS data output from the POS data acquisition unit 202, the teacher data generation unit 203 counts the number of purchasers in the facility FC based on the POS data. As described above, since one set of POS data is generated every purchase, the teacher data generation unit 203 counts the number of purchasers in the facility FC by counting the number of sets of the POS data. In the present embodiment, since the staying person C1 purchases the product 11 in the facility FC, one set of POS data is generated, and the teacher data generation unit 203 counts the number of purchasers as one. Since the staying person C2 stays in the facility FC without purchasing anything, no POS data is generated. Thus, at this time, it can be determined that the total number of MAC addresses is four and the number of purchasers is one, but it is still impossible to estimate the number of persons staying in the facility FC from these facts.

Thus, when the process of step S24 is completed, the teacher data generation unit 203 receives the input of the actual number of staying persons (step S25). For example, the teacher data generation unit 203 asks the user, such as the administrator of the information processing system ST or the person in charge of operation of the information processing system ST, to input the actual number of staying persons, and receives the input of the actual number of staying persons output from the input device 710. The actual number of staying persons can be determined by the user visually checking the number of the persons C1 and C2 staying in the facility FC, for example. Accordingly, the correlation among the total number of the fixed MAC addresses, the total number of the remaining MAC addresses, and the actual number of staying persons can be determined, and in the case that the number of purchasers could be counted based on the acquisition of the POS data, the correlation among the respective total numbers of these two MAC addresses, the number of purchasers, and the actual number of staying persons can be determined.

When the process of step S25 is completed, the teacher data generation unit 203 generates teacher data (step S26). For example, the teacher data generation unit 203 generates one set of teacher data defining the correlation among the respective total numbers of the above two MAC addresses, the number of purchasers, and the actual number of staying persons. When there is a possibility that the actual number of staying persons includes the number of persons who have none of the mobile terminals 10 and 20, a certain percentage of one of the respective total numbers of the two MAC addresses or a certain percentage of the number of purchasers may be defined as the number of persons who do not have any mobile terminal in the teacher data. In other words, in the case that the actual number of staying persons does not include the number of persons who do not have any mobile terminal, since all of the persons who are actually staying are carrying the mobile terminal 10 or 20 or the like, it is not necessary to define a certain percentage of the number in the teacher data. Under this assumption, the number of staying persons estimated through the inference process described later can be determined as the number of the mobile terminals 10 and 20. When the teacher data generation unit 203 generates the teacher data, the teacher data generation unit 203 stores the teacher data in the teacher data storage unit 204. This causes the teacher data storage unit 204 to store one set of teacher data. When the process of step S26 is completed, the information processing server 200 ends the teacher data generation process. As the information processing server 200 executes the teacher data generation process periodically (for example, every several hours including one hour, every day, every month, or the like), the teacher data storage unit 204 stores a plurality of sets of teacher data. To exclude mobile terminals (not illustrated) outside the facility FC, it is desirable for the teacher data generation unit 203 to exclude MAC addresses corresponding to RSSIs lower than a predetermined value from mobile terminals with which the teacher data is to be generated.

FIG. 7B is a flowchart illustrating a model generation process. The model generation process is a process of generating a learned model, and is executed by the information processing server 200. When the teacher data storage unit 204 stores a plurality of sets of teacher data sufficient for generating a learned model, the machine learning unit 205 obtains the plurality of sets of teacher data as illustrated in FIG. 7B (step S31). In more detail, the machine learning unit 205 accesses the teacher data storage unit 204 to obtain the plurality of sets of teacher data from the teacher data storage unit 204.

When the process of step S31 is completed, the machine learning unit 205 generates a learned model (step S32). In more detail, the machine learning unit 205 generates a learned model by machine learning the obtained plurality of sets of teacher data. Since the total number of MAC addresses and the actual number of staying persons differ from each other but have a correlation, coefficients that satisfy this correlation are adjusted and calculated. In addition, since the total number of MAC addresses, the number of purchasers, and the actual number of staying persons have a correlation and are close to each other (see FIG. 9 described later for details), the machine learning unit 205 adjusts and calculates coefficients that satisfy this correlation. When the machine learning unit 205 finishes generating the learned model, the machine learning unit 205 stores the generated learned model in the learned model storage unit 206. This causes the learned model storage unit 206 to store the learned model. When the process of step S32 is completed, the information processing server 200 ends the model generation process. The machine learning unit 205 machine learns the plurality of sets of teacher data using publicly known software library such as TensorFlow (registered trademark) or scikit-learn.

FIG. 8 is a flowchart illustrating the inference process. The inference process is a process of inferring and estimating the number of staying persons using the learned model, and is executed by the information processing server 200. As illustrated in FIG. 8, the MAC log collecting unit 201 collects the log information of the MAC addresses (step S41). Basically, the log information is collected as in the process of step S21, but in the inference period after the aforementioned model generation period, when the MAC log collecting unit 201 collects the log information, the MAC log collecting unit 201 outputs the collected log information to the number-of-staying-persons estimation unit 207.

When the process of step S41 is completed, the number-of-staying-persons estimation unit 207 counts the total number of MAC addresses (step S42). In more detail, the number-of-staying-persons estimation unit 207 counts the total number of MAC addresses for each RSSI based on the received log information. As described in the process of step S23, since various types of MAC addresses are mixedly contained in the log information, the number-of-staying-persons estimation unit 207 extracts fixed MAC addresses from among all the MAC addresses, determines the number of mobile terminals (not illustrated) not having the randomization function, and identifies the remaining MAC addresses as the MAC addresses randomly changing owing to the randomization function, in the same manner as the teacher data generation unit 203. In the process thereafter, it is estimated how many mobile terminals the remaining MAC addresses correspond to, by applying the learned model.

When the process of step S42 is completed, the number-of-staying-persons estimation unit 207 applies the learned model (step S43) to estimate the number of staying persons (step S44). In more detail, the number-of-staying-persons estimation unit 207 accesses the learned model storage unit 206 to obtain the learned model, applies the obtained learned model to the total number of the remaining MAC addresses excluding the total number of the fixed MAC addresses from the total number of MAC addresses, and estimates the number of mobile terminals having the randomization function, such as the mobile terminal 10, to estimate the number of persons who are staying in the facility FC and carrying mobile terminals having the randomization function. By collecting the log information of the MAC addresses and applying the learned model to the number of MAC addresses randomly changing in the aforementioned manner, the number of persons who are staying in the facility FC and carrying mobile terminals having the randomization function can be estimated. Therefore, the number-of-staying-persons estimation unit 207 can estimate the approximate number of persons staying in the facility FC by adding up the number of mobile terminals having the randomization function and the number of mobile terminals not having the randomization function. Further, by adding the number of persons who do not have any mobile terminal to the number of staying persons estimated by the number-of-staying-persons estimation unit 207, the number of staying persons close to the actual number of staying persons can be estimated.

When the number-of-staying-persons estimation unit 207 estimates the number of staying persons, the number-of-staying-persons estimation unit 207 outputs the estimated number of staying persons to the output unit 208 (step S45). When the output unit 208 outputs the number of persons staying in the facility FC to the display device 720, the display device 720 displays the number of persons staying in the facility FC. This allows the user to know the number of persons staying in the facility FC and the approximate number of terminals.

The display manner in the display device 720 is not particularly limited, and the estimated number of staying persons can be displayed in various graphs such as bar graphs or line graphs in time series. When the number-of-staying-persons estimation unit 207 obtains the POS data from the POS terminal 300 and outputs the comparison between the number of sets of the POS data and the number of staying persons, the user can know the number of persons who actually made a purchase and the number of persons who did not make a purchase among the persons staying in the facility FC, via the display device 720.

Figure 10A:
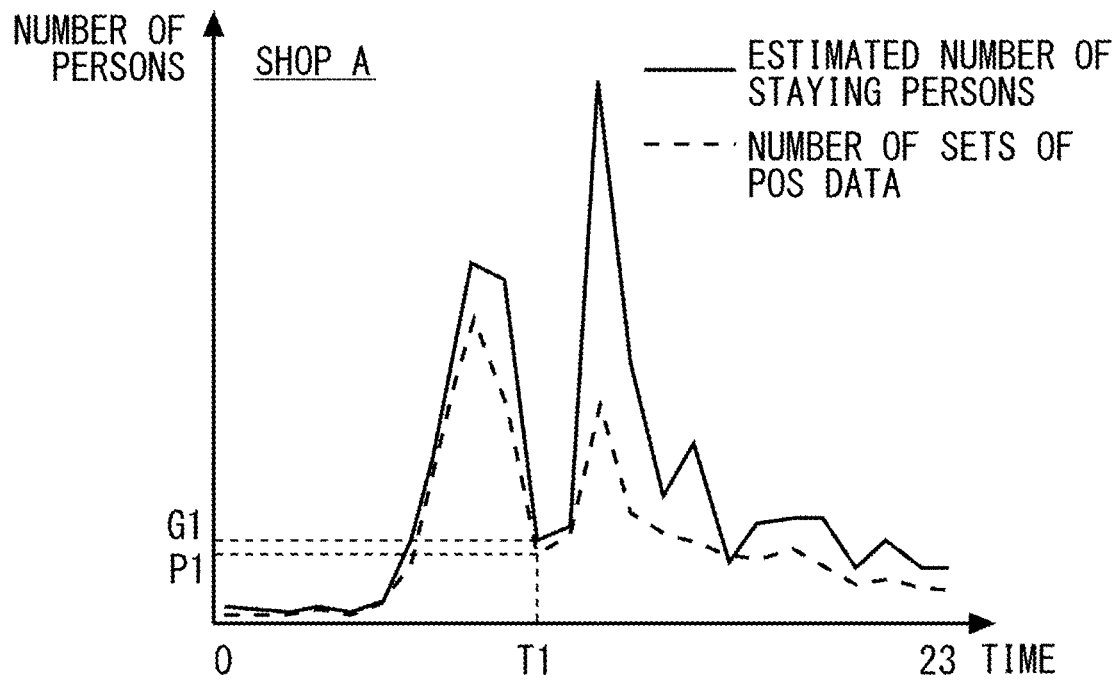
FIG. 10A is a diagram for describing an example of a performance evaluation.
Figure 10B:
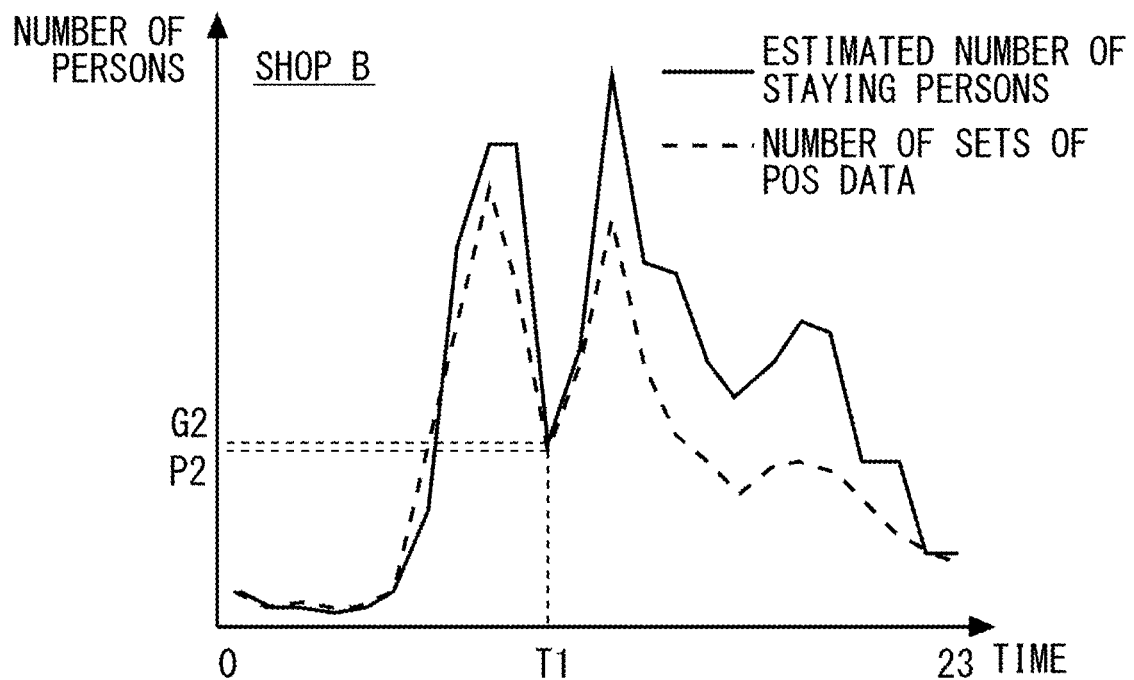
FIG. 10B is a diagram for describing another example of the performance evaluation.

FIG. 9 is a diagram for describing an example of a correlation. FIG. 10A is a diagram for describing an example of the performance evaluation. FIG. 10B is a diagram for describing another example of a performance evaluation. The evaluation date, the evaluation time period, and the evaluation facility represent the date on which the performance of the information processing server 200 was evaluated, the time period for which the performance of the information processing server 200 was evaluated, and the facility for which the performance of the information processing server 200 was evaluated, respectively. As presented in FIG. 9, the evaluation dates and the evaluation facilities are different, but the evaluation time periods are the same. For example, the total number N1$a$ of MAC addresses that change and the total number N1$b$ of fixed MAC addresses in the evaluation facility "Shop A" can be both extracted from the log information as described above. The total number N1$c$ of persons carrying no mobile terminal may be a certain percentage of the number P1 of sets of the POS data, or may be a certain percentage of one of the total numbers N1$a$ and N1$b$. In the case that the number P1 of sets of data is an element of the learned model α1, the number G1 of staying persons can be estimated based on the total numbers N1$a$, N1$b$, and N1$c$ and the learned model α1. In particular, in the case that the number P1 of sets of data is used, the estimated number of staying persons and the number of sets of data correlate highly with each other compared with the case that the number P1 of sets of data is not used, as illustrated in FIG. 10A. In this case, as presented in FIG. 9, when the capture rate of the estimated number G1 of staying persons to the actual number G1' of staying persons is calculated, the capture rate is less than 115%, and the numbers G1 and G1' of staying persons differ only by approximately 15%, and are approximate to each other.

Also for the evaluation facility "Shop B", the same description for the evaluation facility "Shop A" can be applied. In the case of the evaluation facility "Shop B", when the number P2 of sets of data is used, the estimated number of staying persons and the number of sets of data corelate highly with each other compared with those in the case that the number P2 of sets of data is not used, as illustrated in FIG. 10B. In this case, as presented in FIG. 9, when the capture rate of the estimated number G2 of staying persons to the actual number G2' of staying persons is calculated, the capture rate is greater than 85%, and the number G2 of staying persons and the number G2' of staying persons differ only by approximately 15%, and are approximate to each other. As described above, there is a difference between the total number of MAC addresses and the actual number of staying persons, but there is a correlation between the number of staying persons calculated by applying the learned model, which includes the number of purchasers as an element, to the total number of MAC addresses, and the actual number of staying persons, and they are approximate to each other.

As described above, in the first embodiment, the information processing server 200 includes the MAC log collecting unit 201 and the number-of-staying-persons estimation unit 207. The MAC log collecting unit 201 collects log information about MAC addresses from radio waves transmitted by the mobile terminals, which are not illustrated in FIG. 1, carried by persons staying in the facility FC during the inference period. The number-of-staying-persons estimation unit 207 estimates the number of persons staying in the facility FC based on the total number of MAC addresses, which can be counted based on the log information, and the learned model. The learned model is generated by machine learning a plurality of sets of teacher data. In particular, each of the plurality of sets of teacher data defines the relationship between the total number of MAC addresses, which can be counted based on the log information about the MAC addresses collected from the radio waves R1 and R2 transmitted from the mobile terminals 10 and 20 carried by the persons C1 and C2 staying in the facility FC during the model generation period prior to the inference period, and the actual number of persons staying in the facility FC. Use of such a learned model enables to estimate the number of persons staying in the facility FC accurately even when the MAC addresses randomly changing are mixed.

Second Embodiment

Next, with reference to FIG. 11 to FIG. 14, a second embodiment of the present invention will be described.

Figure 11:
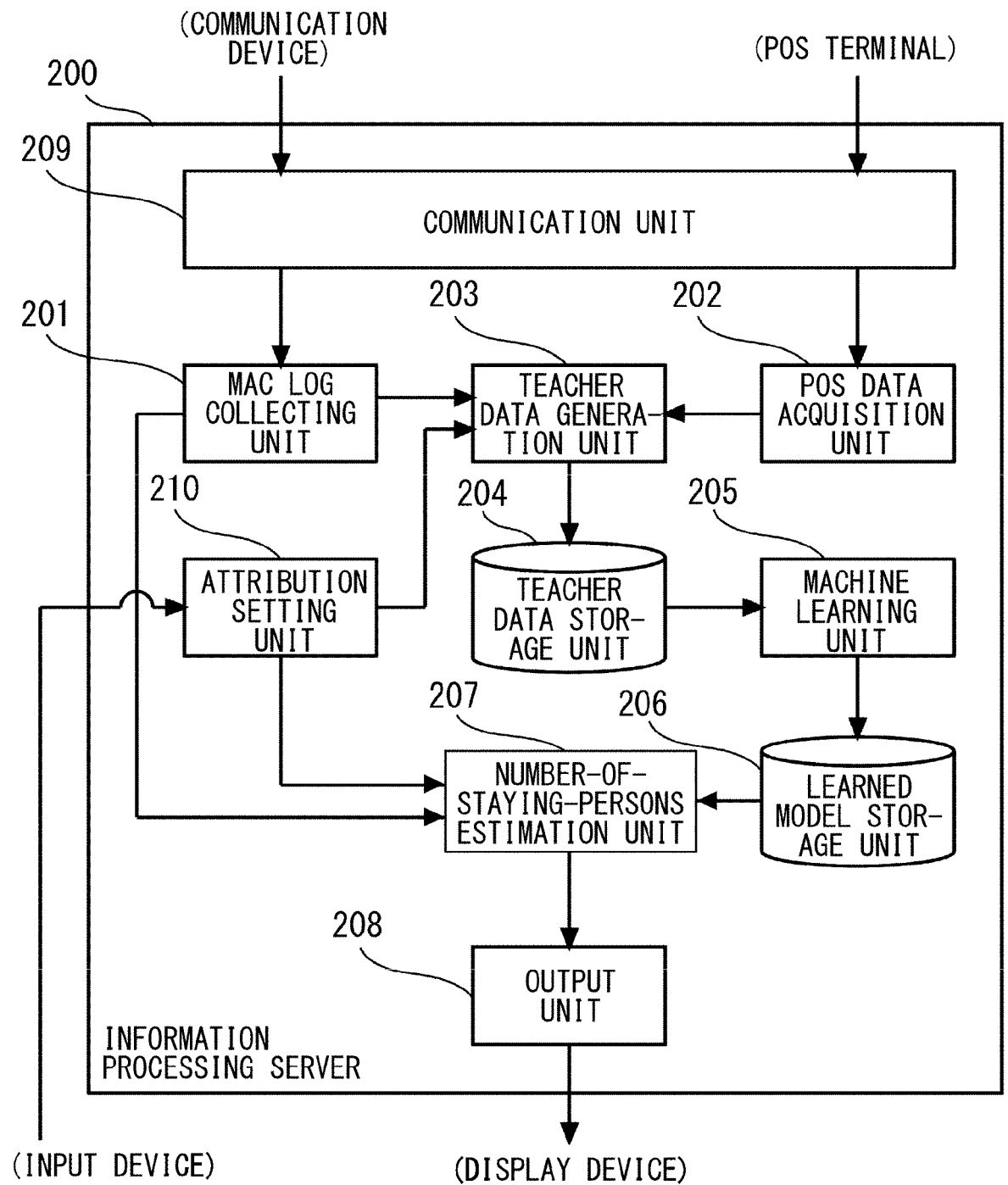
FIG. 11 is a functional block diagram of an information processing server in accordance with a second embodiment.

FIG. 11 is a functional block diagram of the information processing server 200 in accordance with the second embodiment. As illustrated in FIG. 11, the information processing server 200 in accordance with the second embodiment differs from the information processing server 200 in accordance with the first embodiment illustrated in FIG. 5 in that an attribution setting unit 210 is further provided. The attribution setting unit 210 is also implemented by the CPU 200A. The details of the functions implemented by the attribution setting unit 210 will be described in detail when describing the operation of the information processing server 200. In FIG. 11, the same reference numerals are attached to the same units as those of the information processing server 200 illustrated in FIG. 5, and the description thereof is omitted.

Figure 12:
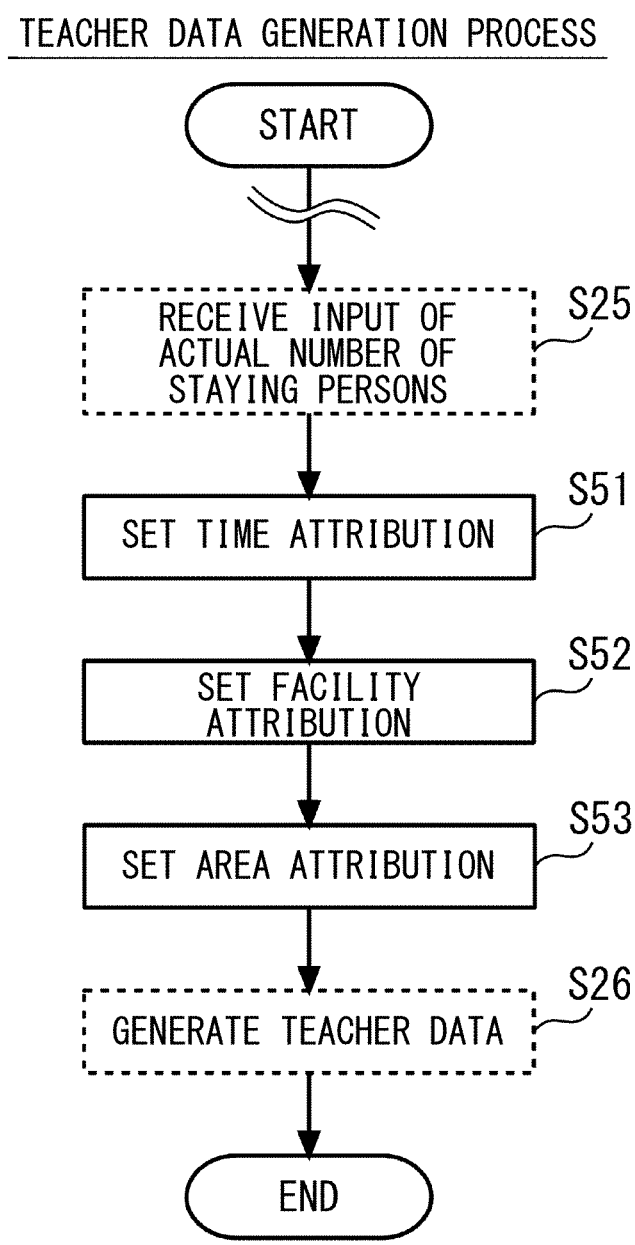
FIG. 12 is a flowchart illustrating another example of the teacher data generation process.
Figure 14:
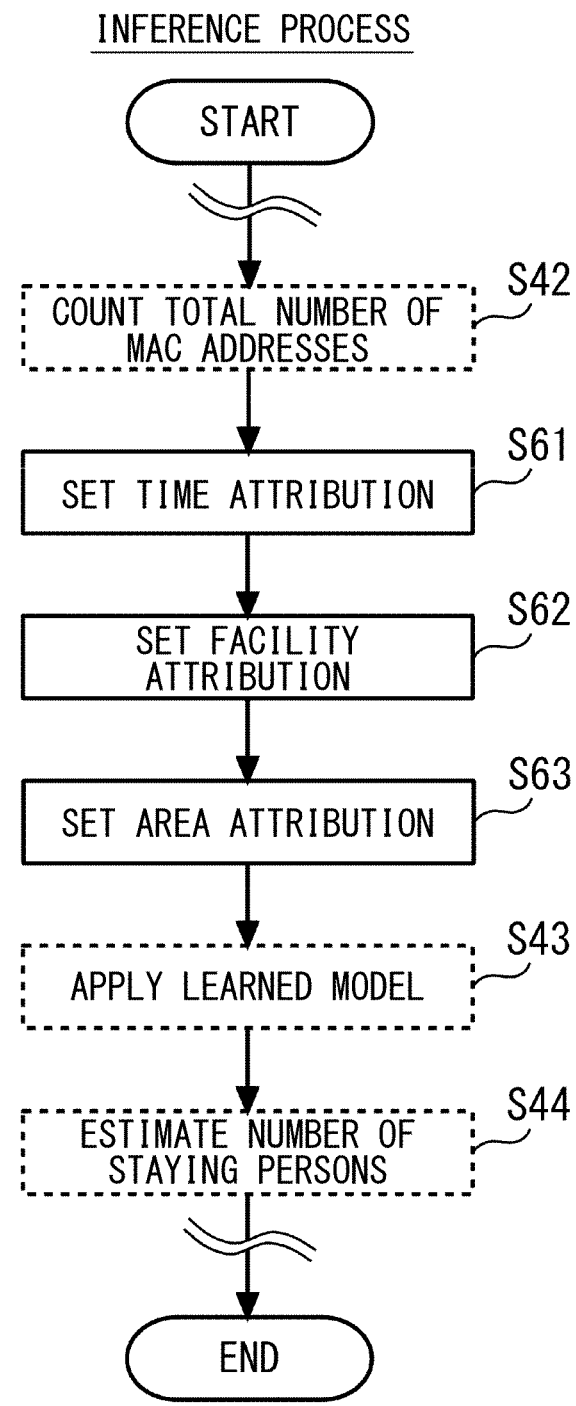
FIG. 14 is a flowchart illustrating another example of the inference process.

With reference to FIG. 12 to FIG. 14, the operation of the information processing server 200 in accordance with the second embodiment will be described.

FIG. 12 is a flowchart illustrating a teacher data generation process. FIG. 13 is a diagram for describing a time attribution, a facility attribution, and an area attribution. FIG. 12 illustrates part of the teacher data generation process. In FIG. 12, the same reference characters are attached to the same processes as those of the teacher data generation process illustrated in FIG. 7A, and the description thereof is omitted. The model generation process in accordance with the second embodiment is the same as the model generation process in accordance with the first embodiment, and the description thereof is thus omitted.

As illustrated in FIG. 12, when the process of step S25 described in the first embodiment is completed, the attribution setting unit 210 sets the time attribution (step S51). In more detail, during the model generation period, when the attribution setting unit 210 receives the time attribution output from the input device 710, the attribution setting unit 210 associates the time attribution with the teacher data generated by the teacher data generation unit 203. The time attribution is an attribution about the time at which the number of staying persons is estimated, and includes a day classification attribution and a time period attribution as illustrated in FIG. 13. The day classification attribution can define not only the tangible day (for example, Monday or the like) but also date classification such as a weekday or a holiday. The time period attribution can define various time periods such as midmorning, going-to-work hours, nighttime periods, or the like. By defining the time attribution in the teacher data, the learned models according to the respective time attributions can be generated in the model generation process.

When the process of step S51 is completed, the attribution setting unit 210 sets the facility attribution (step S52). In more detail, during the model generation period, when the attribution setting unit 210 receives the facility attribution output from the input device 710, the attribution setting unit 210 associates the facility attribution with the teacher data generated by the teacher data generation unit 203. The facility attribution is an attribution relating to the type or the category of the facility for which the number of staying persons is estimated, and can define a small-scale commercial facility or a large-scale commercial facility as illustrated in FIG. 13. By further defining the facility attribution in the teacher data, the learned model according to both the time attribution and the facility attribution can be generated in the model generation process.

When the process of step S52 is completed, the attribution setting unit 210 sets the area attribution (step S53). In more detail, during the model generation period, when the attribution setting unit 210 receives the area attribution output from the input device 710, the attribution setting unit 210 associates the area attribution with the teacher data generated by the teacher data generation unit 203. The area attribution is an attribution relating to the area where the facility, for which the number of staying persons is estimated, is located, and can define a business district and a residential area as illustrated in FIG. 13. By further defining the area attribution in the teacher data, the learned model according to all the time attribution, the facility attribution, and the area attribution can be generated in the model generation process.

When the process of step S53 is completed, the teacher data generation unit 203 executes the process of step S26 described in the first embodiment. This causes the teacher data in which all the time attribution, the facility attribution, and the area attribution are defined, to be generated. In the processes of steps S51 to S53, the attribution setting unit 210 sets all the time attribution, the facility attribution, and the area attribution, but the attribution setting unit 210 may set one of the time attribution, the facility attribution, and the area attribution, or may set two of the time attribution, the facility attribution, and the area attribution in combination. This generates the teacher data in which various combinations of attributions are defined, and generates the learned models according to various attributions in the subsequent model generation process.

For example, in the case that Monday to Friday are set as the day classification attribution of the time attribution, going-to-work hours is set as the time attribution, a small-scale commercial facility is set as the facility attribution, and a business district is set as the area attribution in the teacher data as illustrated in FIG. 13, the distinguishing trend appears in the learned model. More specifically, since there are many company workers in the business district, the frequency of changing the models of the mobile terminals 10 and 20 is high, and as a result, the number of office workers carrying the models having the randomization function tends to be large. During the going-to-work hours from Monday to Friday in the small-scale commercial facility (e.g., a convenience store or the like) in the office district, the dwell time of the office worker staying in the small-scale commercial facility tends to be short. In addition, since the office worker himself/herself makes a purchase, the estimated number of staying persons tends to be close to the number of sets of the POS data.

In addition, in the case that a weekday is set as the day classification attribution of the time attribution, around 15 o'clock representing the time period from 14 o'clock to 16 o'clock is set as the time attribution, a large-scale commercial facility is set as the facility attribution, and the front of a local station is set as the area attribution in the teacher data as illustrated in FIG. 13, another distinguishing trend appears in the learned model. More specifically, since there are many aged persons in the large-scale commercial facility (e.g., a department store or the like) in front of the local station, the frequency of changing the models of the mobile terminals 10 and 20 is low, and as a result, the number of aged persons carrying the models with no randomization function tends to be large. In addition, around 15 o'clock on a weekday in the large-scale commercial facility in front of the local station, the dwell time of the aged person staying in the large-scale commercial facility tends to be long. Furthermore, it is highly likely that many aged persons who are staying in the large-scale commercial facility in front of the local station do not make a purchase, and the estimated number of staying persons tends to separate from the number of sets of the POS data.

As described above, depending on the various attributions set in the teacher data, learned models representing such trends are generated. In addition, on Saturday or Sunday in a residential area, many families visit a medium-scale commercial facility (for example, a hardware store or the like), and the dwell time of each family staying in the medium-scale commercial facility tends to be long. In addition, even when each of the members of a family carries the mobile terminal 10 or 20, only one of them makes a purchase. Therefore, the estimated number of staying persons tends to separate from the number of sets of the POS data. In the amusement facility, many visitors visit in the evening, and the dwell time tends to be long.

FIG. 14 is a flowchart illustrating another example of the inference process. FIG. 14 illustrates part of the inference process. In FIG. 14, the same reference characters are assigned to the same processes as those of the inference process illustrated in FIG. 8, and the description thereof is omitted.

As illustrated in FIG. 14, when the process of step S42 described in the first embodiment is completed, the attribution setting unit 210 sets the time attribution (step S61). In more detail, during the inference period, when the attribution setting unit 210 receives the time attribution output from the input device 710, the attribution setting unit 210 outputs the received time attribution to the number-of-staying-persons estimation unit 207. The time attribution used in the inference process is preferably the same as the time attribution used in the teacher data generation process. This allows the number of staying persons in that time attribution to be estimated accurately.

When the process of step S61 is completed, the attribution setting unit 210 sets the facility attribution (step S62). In more detail, during the inference period, when the attribution setting unit 210 receives the facility attribution output from the input device 710, the attribution setting unit 210 outputs the received facility attribution to the number-of-staying-persons estimation unit 207. The facility attribution used in the inference process is preferably the same as the facility attribution used in the teacher data generation process. This allows the number of staying persons in that facility attribution to be estimated accurately.

When the process of step S62 is completed, the attribution setting unit 210 sets the area attribution (step S63). In more detail, during the inference period, when the attribution setting unit 210 receives the area attribution output from the input device 710, the attribution setting unit 210 outputs the received area attribution to the number-of-staying-persons estimation unit 207. The area attribution used in the inference process is preferably the same as the area attribution used in the teacher data generation process. This allows the number of staying persons in the area attribution to be estimated accurately.

When the process of step S63 is completed, the number-of-staying-persons estimation unit 207 executes the processes of steps S43 and 44. That is, the number-of-staying-persons estimation unit 207 estimates the number of persons staying in the facility FC based on the total number of MAC addresses, the time attribution, the facility attribution, the area attribution, and the learned model generated based on these attributions. This allows the number of staying persons that takes into account, for example, the time attribution, the facility attribution, and the area attribution including trends of difference from the POS data to be estimated accurately.

The various types of attributions used in the teacher data generation process and the various types of attributions used in the inference process are required to correspond to each other. More specifically, when the combination of the time attribution and the facility attribution is used in the teacher data generation process, use of the combination of the time attribution and the facility attribution is required in the inference process. This avoids decrease in estimation accuracy of the number of staying persons due to difference between types of attributions.

Although preferred embodiments of the present invention have been described so far, the present invention is not limited to those particular embodiments, and various changes and modifications may be made to them within the scope of the invention claimed herein. For example, the dwell time calculated based on the difference between the appearance date and time and the disappearance date and time of the fixed MAC address may be used in the teacher data generation process and the inference process.

In the embodiments described above, estimation of the number of persons staying in the facility is described, but this does not intend to suggest any limitation as long as in the environment in which the scanning radio waves that search access points can be received. For example, the survey of pedestrian traffic of passers passing through a specific location (for example, aisles, stairways, parking areas, and the like) in the facility can be used to estimate the number of persons staying in the facility. The area of the facility may be expanded to the neighboring roads centering around the facility, and the survey of pedestrian traffic of passers passing through a specific location (for example, sidewalks, footbridges, crossings, and the like) in the expanded facility can be used to estimate the number of persons staying in the facility.

The invention claimed is:

1. An information processing device, comprising:
a collection unit configured to collect first information about media access control (MAC) addresses from radio waves transmitted by first terminals carried by persons staying in a facility during a first time period, an estimation unit configured to estimate the number of the persons staying based on a first total number of MAC addresses, which is configured to be counted based on the first information, and a learned model, and a determination unit configured to determine a third total number of predetermined MAC addresses that change randomly, from the first total number based on a first half of each of the MAC addresses, wherein:
the learned model is generated by machine learning a plurality of sets of teacher data each defining a relationship between a second total number of MAC addresses, which is configured to be counted based on second information about MAC addresses collected from radio waves transmitted from second terminals in the facility during a second time period prior to the first time period, and the number of persons who actually stayed in the facility, and
the estimation unit is configured to estimate part of the number of the persons staying based on the third total number determined by the determination unit and the learned model.

2. An information processing device, comprising:
a collection unit configured to collect first information about media access control (MAC) addresses from radio waves transmitted from first terminals carried by persons staying in a facility during a first time period, and an estimation unit configured to estimate the number of the persons staying based on a first total number of MAC addresses, which is configured to be counted based on the first information, and a learned model, wherein the learned model is generated by machine-learning a plurality of sets of teacher data each defining a relationship among a second total number of MAC addresses, which is configured to be counted based on second information about MAC addresses collected from radio waves transmitted from second terminals in the facility during a second time period prior to the first period, the number of purchasers who made a purchase in the facility during the second time period, and the number of persons who actually stayed in the facility.

3. The information processing device according to claim 1, further comprising:
a generation unit configured to determine the number of the persons staying estimated based on the first total number and the learned model as the number of the first terminals under an assumption that all the persons who actually stayed carry the second terminals.

4. The information processing device according to claim 1, wherein:
the learned model is generated by machine learning the plurality of sets of teacher data each further defining at least one of the following attributions: an attribution of time when the number of the persons staying is estimated, an attribution of the facility, and an attribution of an area where the facility is located, and
the estimation unit is configured to estimate the number of the persons staying based on the first total number, an attribution corresponding to the at least one, and the learned model.

5. The information processing device according to claim 1, wherein:
the learned model is generated by machine learning the plurality of sets of teacher data each further defining all of the following attributions: an attribution of time when the number of the persons staying is estimated, an attribution of the facility, and an attribution of an area where the facility is located, and
the estimation unit is configured to estimate the number of the persons staying based on the first total number, attributions corresponding to the all, and the learned model.

6. The information processing device according to claim 1, wherein the radio waves are scanning radio waves for searching a repeater for a wireless local area network (LAN).

7. An information processing method, wherein:
a computer executes a process comprising:
collecting first information about media access control (MAC) addresses from radio waves transmitted from first terminals carried by persons staying in a facility during a first time period, and
estimating the number of the persons staying based on a first total number of MAC addresses, which is configured to be counted based on the first information, and a learned model,
the learned model is generated by machine learning a plurality of sets of teacher data each defining a relationship between a second total number of MAC addresses, which is configured to be counted based on second information about MAC addresses collected from radio waves transmitted from second terminals in the facility during a second time period prior to the first time period, and the number of persons who actually stayed in the facility, and
in the process, a third total number of predetermined MAC addresses that randomly change is determined from the first total number based on a first half of each of the MAC addresses, and part of the number of the persons staying is estimated based on the third total number and the learned model.

8. An information processing method, wherein:
a computer executes a process comprising:
collecting first information about media access control (MAC) addresses from radio waves transmitted from first terminals carried by persons staying in a facility during a first time period, and
estimating the number of the persons staying based on a first total number of MAC addresses, which is configured to be counted based on the first information, and a learned model, and
the learned model is generated by machine learning a plurality of sets of teacher data each defining a relationship among a second total number of MAC addresses, which is configured to be counted based on second information about MAC addresses collected from radio waves transmitted from second terminals in the facility during a second time period prior to the first time period, the number of purchasers who made a purchase in the facility during the second time period, and the number of persons who actually stayed in the facility.

9. A system, comprising:
a receiver and an information processing device, wherein:
the receiver is configured to:
generate first information about media access control (MAC) addresses from radio waves transmitted from first terminals carried by persons staying in a facility during a first time period, and
when receiving a second radio wave transmitted from a second terminal in the facility during a second time period prior to the first time period, generate second information about a MAC address from the second radio wave,
the information processing device is configured to collect the first information through the receiver, and estimate the number of the persons staying based on a first total number of MAC addresses, which is configured to be counted based on the first information, and a learned model,
the learned model is generated by machine learning a plurality of sets of teacher data each defining a relationship between a second total number of MAC addresses, which is configured to be counted based on the second information, and the number of persons who actually stayed in the facility, and
the information processing device is configured to determine a third total number of predetermined MAC addresses that randomly change from the first total number based on a first half of each of the MAC addresses and estimate part of the number of the persons staying based on the third total number and the learned model.

10. A system, comprising:
a receiver and an information processing device, wherein:
the receiver is configured to:
generate first information about media access control (MAC) addresses from radio waves transmitted from first terminals carried by persons staying in a facility during a first time period, and
when receiving a second radio wave transmitted from a second terminal in the facility during a second time period prior to the first time period, generate second information about a MAC address from the second radio wave,
the information processing device is configured to collect the first information through the receiver, and estimate the number of the persons staying based on a first total number of MAC addresses, which is configured to be counted based on the first information, and a learned model, and the learned model is generated by machine learning a plurality of sets of teacher data each defining a relationship among a second total number of MAC addresses, which is configured to be counted based on the second information, the number of purchasers who made a purchase in the facility during the second time period, and the number of persons who actually stayed in the facility.

* * * * *